United States Patent
Kong et al.

(10) Patent No.: US 11,822,326 B2
(45) Date of Patent: Nov. 21, 2023

(54) VOTER-BASED METHOD OF CONTROLLING REDUNDANCY, ELECTRONIC DEVICE, AND STORAGE MEDIUM

(71) Applicants: Beijing Superstring Academy of Memory Technology, Beijing (CN); Tsinghua University, Beijing (CN)

(72) Inventors: Xiangyu Kong, Beijing (CN); Jianfeng Zhu, Beijing (CN); Shouyi Yin, Beijing (CN); Shaojun Wei, Beijing (CN)

(73) Assignees: Beijing Superstring Academy of Memory Technology, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 17/554,932

(22) Filed: Dec. 17, 2021

(65) Prior Publication Data
US 2023/0168636 A1    Jun. 1, 2023

(30) Foreign Application Priority Data
Nov. 30, 2021   (CN) ......................... 202111448885.8

(51) Int. Cl.
*G05B 9/03*   (2006.01)
*G06F 11/14*   (2006.01)

(52) U.S. Cl.
CPC ............ *G05B 9/03* (2013.01); *G06F 11/1494* (2013.01)

(58) Field of Classification Search
CPC .............................. G06F 11/1494; G05B 9/03
USPC ............................................................ 714/3
See application file for complete search history.

(56) References Cited

U.S. PATENT DOCUMENTS

| 2002/0095617 A1* | 7/2002 | Norman ................ G06F 3/0488 714/10 |
| 2014/0173335 A1* | 6/2014 | Dworakowski ..... G06F 11/2007 714/4.11 |

\* cited by examiner

*Primary Examiner* — Yair Leibovich
(74) *Attorney, Agent, or Firm* — Thomas | Horstemeyer, LLP

(57) ABSTRACT

A voter-based method of controlling a redundancy is provided, including acquiring a processing element array in a target hardware, wherein the processing element array includes a plurality of processing elements, selecting a plurality of groups of processing elements from the processing element array so as to generate a voter set, wherein a corresponding voter is generated for each group of the plurality of groups of processing elements, and the corresponding voter configured to perform a voting operation in a redundancy control, acquiring, in response to a message indicating a fault state of a detected voter, a target voter from the voter set so as to replace the detected voter, and re-performing the voting operation in the redundancy control by using the target voter. An electronic device and a storage medium are further provided, which are implemented based on the processing element array of the target hardware.

15 Claims, 4 Drawing Sheets

VOTER-BASED METHOD OF CONTROLLING REDUNDANCY, ELECTRONIC DEVICE, AND STORAGE MEDIUM

CROSS-REFERENCE TO RELATED APPLICATION

This application claims the benefit of Chinese Patent Application No. 202111448885.8 filed on Nov. 30, 2021 in the State Intellectual Property Office of China, the whole disclosure of which is incorporated herein by reference.

TECHNICAL FIELD

The present disclosure relates to a field of a computer technology, and in particular to a voter-based method of controlling a redundancy, an electronic device, and a storage medium.

BACKGROUND

With a rapid development of an electronics industry, an integrated circuit has been greatly improved in performance and functions, and is widely used in artificial intelligence, automotive electronics, aerospace, network communications, cloud computing, biological information, medical and other fields. Accordingly, a reliability of the integrated circuit has become a focus of attention in the electronics industry.

A current scheme of improving the reliability of the integrated circuit is generally implemented using a spatial redundancy technology, in which a plurality of redundant branches are used to separately execute a program, and then a calculation result obtained is implemented by performing a voting operation using a voter. At present, a related art is generally implemented to change a structure of a processing element in a hardware device to make it suitable for performing the spatial redundancy and the voting operation, or it is assumed that enough processing elements are provided to achieve the spatial redundancy and the voting operation. Therefore, a large overhead is required for a hardware resource, and it is difficult to process when the voter fails.

SUMMARY

A first aspect of the embodiments of the present disclosure provides a voter-based method of controlling a redundancy, including:
  acquiring a processing element array in a target hardware, wherein the processing element array includes a plurality of processing elements;
  selecting a plurality of groups of processing elements from the processing element array so as to generate a voter set, wherein a corresponding voter is generated for each group of the plurality of groups of processing elements, and the corresponding voter is configured to perform a voting operation in a redundancy control; and
  acquiring, in response to a message indicating a fault state of a detected voter, a target voter from the voter set to replace the detected voter, and re-performing the voting operation in the redundancy control by using the target voter.

In an embodiment of the present disclosure, the voter-based method of controlling the redundancy further includes: before acquiring the processing element array in the target hardware,
  acquiring a redundancy mode adopted for the target hardware and a voter corresponding to the redundancy mode, wherein the redundancy mode includes an N-modular redundancy in which an N-modular voter connected to N redundant branches is adopted for the target hardware, or a double modular redundancy in which a double modular voter connected to two redundant branches is adopted for the target hardware, where $N>2$ and N is an integer;
  acquiring the processing element array in the target hardware, in a case that the N-modular redundancy is adopted as the redundancy mode; and
  switching, in a case that the double modular redundancy is adopted as the redundancy mode, the redundancy mode adopted for the target hardware to the N-modular redundancy in response to a message indicating a fault state of a redundant branch connected to a detected double modular voter.

In an embodiment of the present disclosure, the voter-based method of controlling the redundancy further includes:
  dividing the processing elements in the processing element array into N groups of computing elements and at least one group of idle elements, wherein an interconnection relationship of the N groups of computing elements is equivalent to an interconnection relationship of the at least one group of idle elements, each group of the N groups of computing elements is configured to perform a calculation operation on a redundant branch, and each group of the at least one group of idle elements is configured to, in response to a fault state of a computing element, replace a group of computing elements including the computing element in the fault state and perform the calculation operation; and
  replacing, in response to a message indicating a fault state of a redundant branch connected to the detected voter, the group of computing elements including the computing element in the fault state with the group of idle elements, and re-performing the calculation operation on the redundant branch.

In an embodiment of the present disclosure, the selecting a plurality of groups of processing elements from the processing element array so as to generate a voter set includes:
  acquiring a voter model with an N-modular redundancy as a redundancy mode;
  performing a static compilation on the voter model using an integer linear programming, so as to obtain a compilation result;
  selecting a group of processing elements from the processing element array according to the compilation result, so as to form a voter;
  traversing the processing element array to find each group of processing elements with the same interconnection relationship as the selected group of processing elements; and
  generating the voter set based on the voter and each found group of processing elements, wherein each found group of processing elements forms a voter.

In an embodiment of the present disclosure, the voter set includes a to-be-sorted voter and a sorted voter, and a top-sorted voter in the sorted voter is an arbitrary voter in the voter set, and the method further includes: after generating the voter set,
  acquiring each to-be-sorted voter and each sorted voter in the voter set;

calculating a similarity between each to-be-sorted voter and each sorted voter;

calculating, for each to-be-sorted voter, an average value of the similarity between the to-be-sorted voter and each sorted voter; and determining a to-be-sorted voter with a smallest average value as a sorted voter sorted below each sorted voter acquired, and repeatedly acquiring each to-be-sorted voter and each sorted voter in the voter set until each voter in the voter set is sorted.

In an embodiment of the present disclosure, the calculating a similarity between each to-be-sorted voter and each sorted voter includes:

increasing a similarity value for the to-be-sorted voter and the sorted voter by a first preset value in a case that a group of processing elements corresponding to the to-be-sorted voter and a group of processing elements corresponding to the sorted voter include the same processing element, and a position of the processing element in the group of processing elements corresponding to the to-be-sorted voter is the same as a position of the processing element in the group of processing elements corresponding to the sorted voter;

increasing the similarity value for the to-be-sorted voter and the sorted voter by a second preset value in a case that the group of processing elements corresponding to the to-be-sorted voter and the group of processing elements corresponding to the sorted voter include the same processing element, and a position of the processing element in the group of processing elements corresponding to the to-be-sorted voter is different from a position of the processing element in the group of processing elements corresponding to the sorted voter, wherein the second preset value is less than the first preset value; and calculating, for each to-be-sorted voter, a sum of the first preset value and the second preset value, so as to obtain the similarity between the to-be-sorted voter and the sorted voter.

In an embodiment of the present disclosure, the acquiring a target voter from the voter set to replace the detected voter, and re-performing the voting operation in the redundancy control by using the target voter includes:

acquiring a next voter sorted below the detected voter in the voter set, so as to replace the detected voter; and re-performing the voting operation in the redundancy control by using a group of processing elements corresponding to the next voter.

In an embodiment of the present disclosure, the target hardware is a software-defined chip or a field programmable gate array.

A second aspect of the embodiments of the present disclosure provides an electronic device, including a memory, a processor, and a computer program stored in the memory and executable on the processor, wherein the processor, when executing the program, is allowed to implement the voter-based method of controlling the redundancy provided by the first aspect of the embodiments of the present disclosure.

A third aspect of the embodiments of the present disclosure provides a computer-readable storage medium having a computer program stored thereon, wherein the computer program, when executed by a processor, is allowed to implement the voter-based method of controlling the redundancy provided by the first aspect of the embodiments of the present disclosure.

BRIEF DESCRIPTION OF THE DRAWINGS

In order to more clearly illustrate the technical solutions in the embodiments of the present disclosure or a related art, the drawings required in the description of the embodiments or the related art are briefly introduced below. The drawings in the following description illustrate only some embodiments of the present disclosure. For those skilled in the art, further drawings may be obtained from these drawings without carrying out any inventive effort.

DETAILED DESCRIPTION OF EMBODIMENTS

In order to make objectives, features and advantages of the present disclosure more apparent, the technical solutions in the embodiments of the present disclosure will be described clearly and comprehensively with reference to the accompanying drawings in the embodiments of the present disclosure. Obviously, the described embodiments are only a part of the embodiments of the present disclosure, rather than all the embodiments. All other embodiments obtained by those skilled in the art without any inventive effort based on the embodiments in the present disclosure fall within the scope of protection of the present disclosure.

The present disclosure provides a voter-based method of controlling a redundancy, including: acquiring a processing element array in a target hardware, the processing element array includes a plurality of processing elements; selecting a plurality of groups of processing elements from the processing element array so as to generate a voter set, each group of the plurality of groups of processing elements generates a voter configured to perform a voting operation in a redundancy control; acquiring, in response to a message indicating a fault state of a detected voter, a target voter from the voter set so as to replace the detected voter; and re-performing the voting operation in the redundancy control by using the target voter. The voter-based method of controlling the redundancy may be implemented on a limited resource of the target hardware, and no additional resource is required. Further, a problem of voter fault may be solved, and a response to the voter fault may be made immediately.

Hereinafter, some embodiments of the present disclosure will be described in detail with reference to the accompanying drawings. In a case of no conflict between various embodiments, the embodiments described below and the features in the embodiments may be combined with each other.

Figure 1:
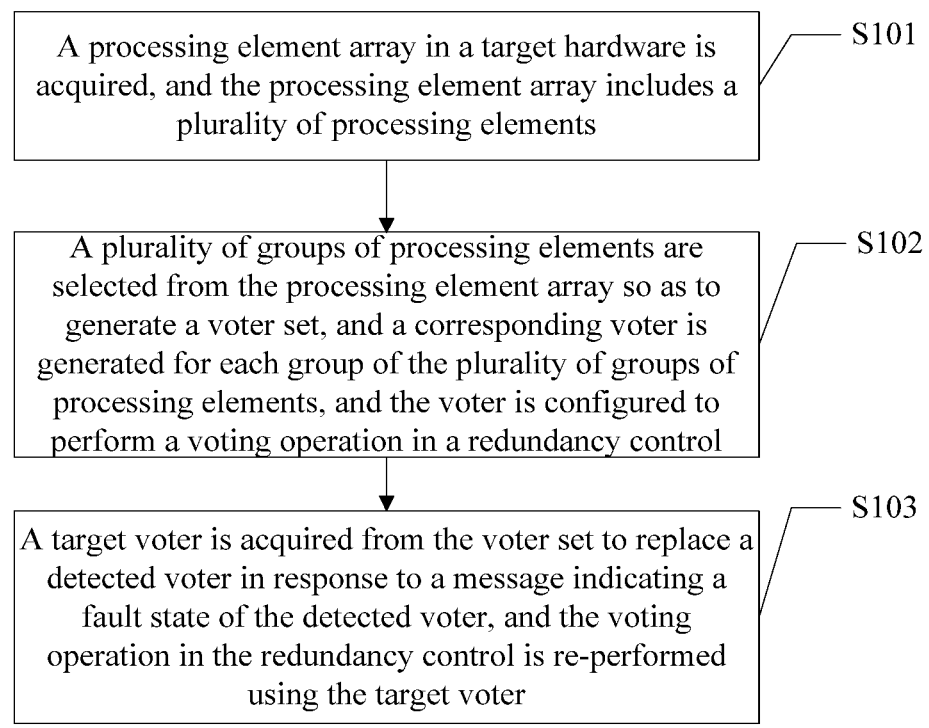
FIG. 1 shows a schematic flowchart of a voter-based method of controlling a redundancy provided by an embodiment of the present disclosure.

Now referring to FIG. 1, FIG. 1 shows a schematic flowchart of a voter-based method of controlling a redundancy provided by an embodiment of the present disclosure. An executive body of the voter-based method of controlling the redundancy is a voting device. It may be understood that the voting device may be implemented as software or a combination of software and hardware. The method mainly includes the following operations.

In S101, a processing element array in a target hardware is acquired, and the processing element array includes a plurality of processing elements.

In the present disclosure, the target hardware refers to a hardware device for implementing the voter-based method of controlling the redundancy. The target hardware may be any hardware device that needs to implement a voting operation, such as a software-defined chip or a field programmable gate array (FPGA), etc.

In the present disclosure, the processing element array (PEA) refers to a set of smallest computing elements for performing a calculation operation in the target hardware. The PEA may include a plurality of processing elements (PE), and the PE is the smallest computing element for performing the calculation operation.

In S102, a plurality of groups of processing elements are selected from the processing element array so as to generate a voter set, and each group of the plurality of groups of processing elements generates a voter configured to perform a voting operation in a redundancy control.

In the present disclosure, when the target hardware runs a program, a redundancy control technology may be adopted, and a voter of a type corresponding to the redundancy control technology may be used to perform the voting operation on a running result of the program, so as to improve a hardware fault tolerance. The type of the voter depends on a spatial redundancy mode adopted by the target hardware. For example, if a triple modular redundancy (TMR) is adopted as the redundancy mode of the target hardware, the voter may be a triple modular voter connected to three redundant branches. If a double modular redundancy (DMR) is adopted as the redundancy mode of the target hardware, the voter may be a double modular voter connected to two redundant branches. Each redundant branch is used to independently execute the above-mentioned program to obtain a running result. The voter is used to vote for a correct running result from a plurality of running results based on a voting principle that the minority is subordinate to the major.

In the present disclosure, a plurality of groups of processing elements are selected from the processing element array, and each group of processing elements may be used to generate a voter, that is, each group of processing elements may implement a voting logic of the voter, and a voting operation may be performed using the group of processing elements. In an example, the processing element array may be {PE0, PE1, PE2, PE3, PE4, PE5, PE6, PE7, PE8, PE9, PE10, PE11, PE12, PE13, PE14, PE15}, and three groups of processing elements including {PE1, PE3, PE4, PE5, PE6, PE7, PE9}, {PE3, PE4, PE5, PE6, PE10, PE11} and {PE0, PE3, PE4, PE5, PE6, PE7, PE8, PE9} may be selected from the processing element array to perform the voting operation.

In S103, a target voter is acquired from the voter set to replace a detected voter in response to a message indicating a fault state of the detected voter, and the voting operation in the redundancy control is re-performed using the target voter. In the present disclosure, the voter may output a voting result for the running result of the program and a detected fault detection result, and the fault detection result may include a redundant branch fault and a voter fault.

When the output fault detection result indicates the voter fault, a message indicating a fault state of the voter is transmitted, and when the output fault detection result indicates a fault of a redundant branch connected to the voter, a message indicating a fault state of the redundant branch connected to the voter is transmitted.

In the present disclosure, the target voter may be an arbitrary voter in the voter set except the fault voter, or may be a voter with a specific relationship with the fault voter. The specific relationship may be, for example, the target voter has a smallest similarity with the fault voter, or the similarity between the target voter and the fault voter is within a preset threshold range, which is not specifically limited in the present disclosure.

According to the embodiments of the present disclosure, the processing element array in the target hardware may be acquired, and the processing element array includes a plurality of processing elements; a plurality of groups of processing elements may be selected from the processing element array so as to generate a voter set, and a voter is generated for each group of the plurality of groups of processing elements, and the voter is used to perform a voting operation in a redundancy control; a target voter may be acquired from the voter set to replace a detected voter in response to a message indicating a fault state of the detected voter; and the voting operation in the redundancy control may be re-performed using the target voter. The method described above may be implemented based on the processing element array of the target hardware, i.e., based on a limited resource without an additional resource, so that a universality of the method may be greatly improved. Further, a problem of voter fault may be solved, and a response to the voter fault may be made immediately.

Figure 2:
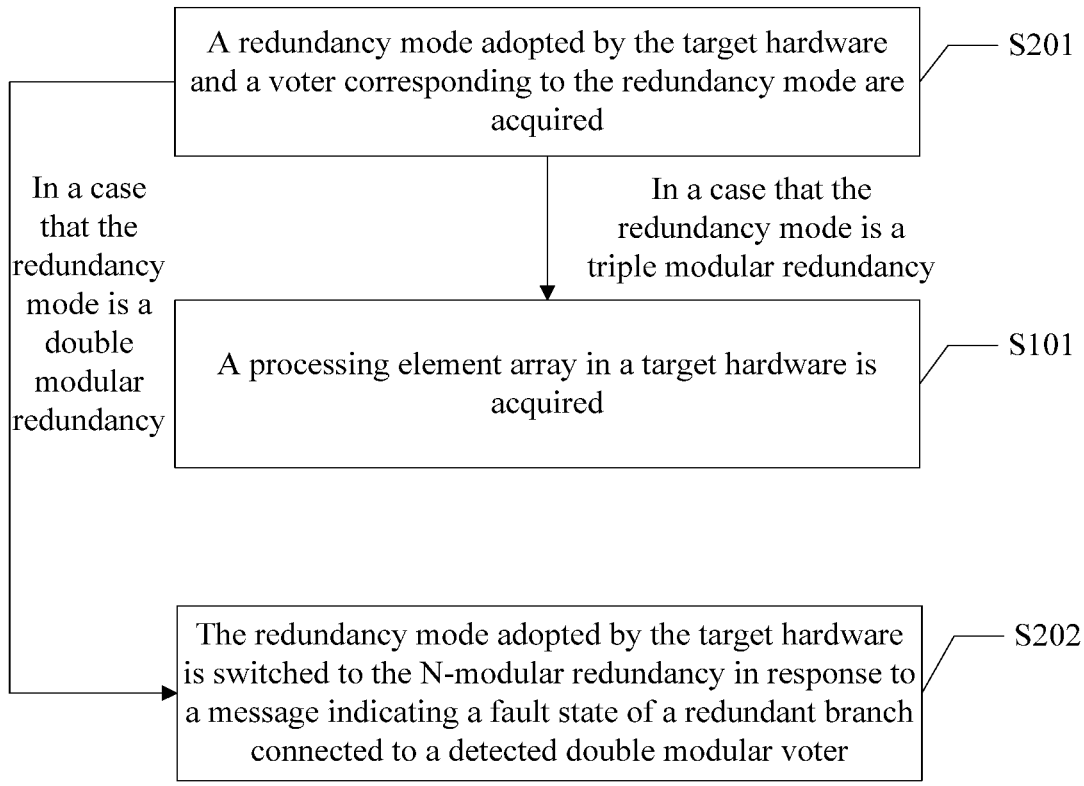
FIG. 2 shows a schematic flowchart of a voter-based method of controlling a redundancy provided by an embodiment of the present disclosure.

Now referring to FIG. 2, FIG. 2 shows a schematic flowchart of a voter-based method of controlling a redundancy provided by an embodiment of the present disclosure. On the basis of the embodiment shown in FIG. 1, referring to FIG. 2 in conjunction with FIG. 1, the voter-based method of controlling the redundancy shown in this embodiment may further include the following operations.

In S201, a redundancy mode adopted by the target hardware and a voter corresponding to the redundancy mode are acquired.

In a case that an N-modular redundancy is adopted as the redundancy mode, the operation S101 is performed to acquire the processing element array in the target hardware.

In a case that a double modular redundancy is adopted as the redundancy mode, operation 202 is performed to switch the redundancy mode adopted by the target hardware to the N-modular redundancy in response to a message indicating a fault state of a redundant branch connected to a detected double modular voter.

In the present disclosure, the redundancy mode includes the N-modular redundancy in which an N-modular voter connected to N redundant branches is adopted for the target hardware or a double modular redundancy in which a double modular voter connected to two redundant branches is adopted for the target hardware, where N>2 and N is an integer.

In the present disclosure, a triple modular redundancy is illustrated as an example of the N-modular redundancy. In the triple modular redundancy, if one of the redundant branches is in the fault state which results in an error in a calculation of the running result of the program, and the running results of the program obtained by the other two redundant branches may be calculated correctly, then a correct result may still be obtained by performing the voting operation. However, in the double modular redundancy, only output values for two redundant branches may be obtained. When the output values for the two redundant branches do not match, the correct result may not be output by performing the voting operation in a case of fault.

According to the embodiments of the present disclosure, when the double modular redundancy is adopted for the target hardware, if the redundant branch connected to the voter is in the fault state, a reliability of the target hardware may be ensured by performing a dynamic compilation, that is, by way of switching the redundancy mode of the target hardware to the N-modular redundancy.

Figure 3:
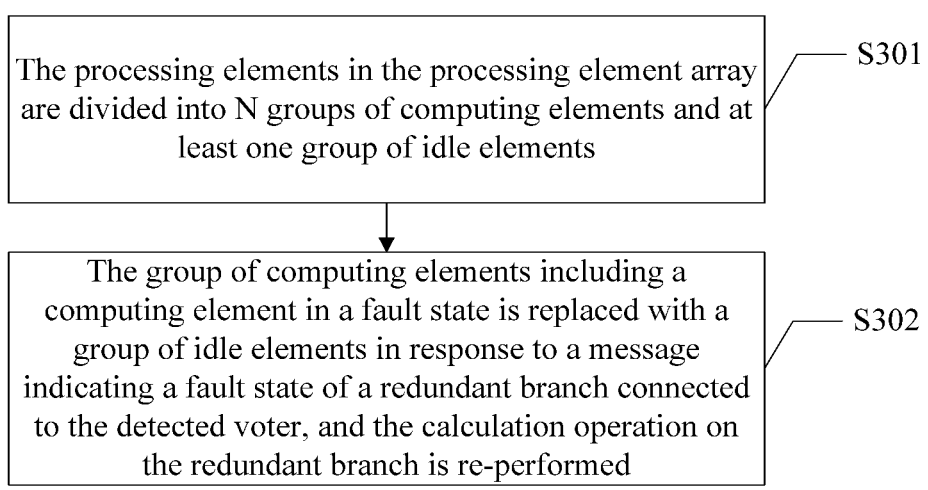
FIG. 3 shows a schematic flowchart of a voter-based method of controlling a redundancy provided by an embodiment of the present disclosure.

Now referring to FIG. 3, FIG. 3 shows a schematic flowchart of a voter-based method of controlling a redundancy provided by an embodiment of the present disclosure. On the basis of the embodiment shown in FIG. 1 or FIG. 2, referring to FIG. 3, the voter-based method of controlling the redundancy shown in this embodiment may further include the following operations.

In S301, the processing elements in the processing element array are divided into N groups of computing elements and at least one group of idle elements.

In S302, a group of computing elements including a computing element in a fault state is replaced with a group of idle elements in response to a message indicating a fault state of a redundant branch connected to the detected voter, and the calculation operation on the redundant branch is re-performed.

In the present disclosure, an interconnection relationship of the N groups of computing elements is equivalent to an interconnection relationship of the at least one group of idle elements, each group of the N groups of computing elements is used to perform a calculation operation on a redundant branch, and each group of the at least one group of idle elements is used to, in response to a fault state of a computing element, replace the group of computing elements including the computing element in the fault state and perform the calculation operation.

In the present disclosure, the interconnection relationship refers to a connection relationship between the computing elements, and the equivalent interconnection relationship means that each group of computing elements includes the same number of computing elements, and the computing elements in each group of computing elements have the same connection relationship.

In the present disclosure, the static compilation may be performed on any group of computing elements, and a compiled group of computing elements may be used to perform a calculation operation on a redundant branch. Furthermore, after the static compilation is performed on the group of computing elements, a compilation result may be mapped to the remaining groups of computing elements by using a template conversion method, so as to achieve the static compilation on the remaining groups of computing elements.

In the present disclosure, the number N of the divided groups of computing elements is not less than the number of redundant branches connected to the voter adopted by the target hardware. For example, when the triple modular redundancy is adopted as the redundancy mode of the target hardware, that is, when the voter is connected to three redundant branches, i.e., N≥3, then the processing elements in the processing element array are divided into at least three groups of computing elements. When a quadruple modular redundancy is adopted as the redundancy mode of the target hardware, that is, when the voter is connected to four redundant branches, i.e., N≥4, then the processing elements in the processing element array are divided into at least four groups of computing elements.

In the present disclosure, a specific division of the processing elements in the processing element array is not specifically limited, as long as the N groups of computing elements have equivalent interconnection relationship. Taking the processing element array including 4×4 processing elements and N=3 as an example, each group of computing elements may include 1 to 4 processing elements. For example, the processing element array may be divided into three groups of computing elements, each group of computing elements include four processing elements, and the remaining four processing elements may constitute a group of idle elements. For another example, the processing element array may be divided into three groups of computing elements, each group of computing elements include three processing elements, and the remaining seven processing elements may constitute two groups of idle elements.

According to the embodiments of the present disclosure, the processing elements in the processing element array may be divided into N groups of computing elements and at least one group of idle elements, and the interconnection relationship of the N groups of computing elements is equivalent to the interconnection relationship of the at least one group of idle elements. When the redundant branch connected to the voter is in a fault state, the group of computing elements in the fault state on the redundant branch may be replaced with the group of idle elements. This method may be implemented based on the processing element array of the target hardware, i.e., based on a limited resource without other additional resources, so that the university may be greatly improved. In addition, the problem of the redundant branch fault may be solved.

Figure 4:
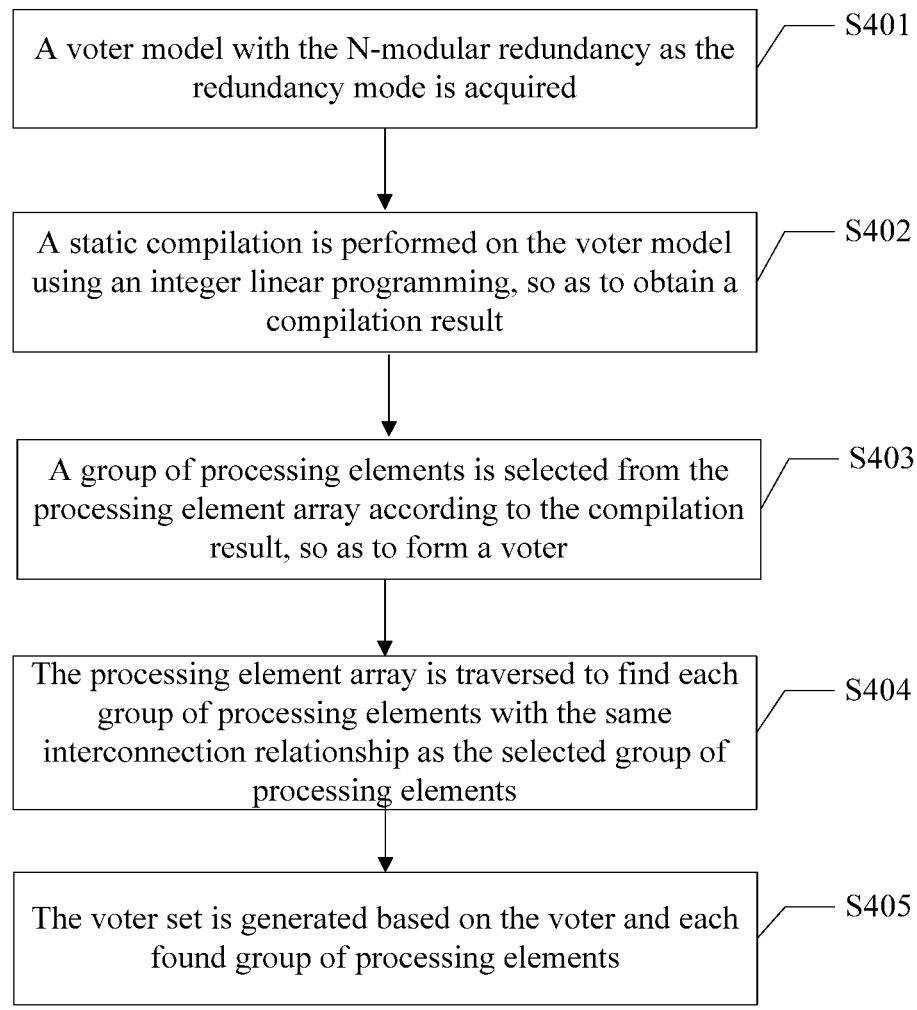
FIG. 4 shows a schematic flowchart of operation S102 shown in FIG. 1 provided by an embodiment of the present disclosure.

Now referring to FIG. 4, FIG. 4 shows a schematic flowchart of operation S102 shown in FIG. 1. On the basis of the embodiments described above and with reference to FIG. 1, in this embodiment, the operation S102 of selecting a plurality of groups of processing elements from the processing element array so as to generate a voter set may include following operation.

In S401, a voter model with the N-modular redundancy as the redundancy mode is acquired.

In the present disclosure, it may be understood that if the triple modular redundancy is adopted as the redundancy mode of the target hardware, the voter model is a triple modular voter connected to three redundant branches, and if a quintuple modular redundancy is adopted as the redundancy mode of the target hardware, the voter is a quintuple modular voter connected to five redundant branches.

In S402, a static compilation is performed on the voter model using an integer linear programming, so as to obtain a compilation result.

In S403, a group of processing elements is selected from the processing element array according to the compilation result, so as to form a voter.

In the present disclosure, the integer linear programming (ILP) is a linear programming in which a variable takes an integer value, and which is a common abstract method of static compilation in the software-defined chip. By means of ILP, an optimal solution may be solved to meet a requirement for a startup interval, a resource usage and other indicators. In an example, taking the processing element array including a 4×4 array of {PE0, PE1, PE2, PE3, PE4, PE5, PE6, PE7, PE8, PE9, PE10, PE11, PE12, PE13, PE14, PE15} and the voter model being a triple modular voter as an example, after the static compilation is performed on the triple modular voter, the obtained compilation result may be mapped to obtain the voter {PE1, PE2, PE5, PE6, PE7, PE10, PE14}.

In S404, the processing element array is traversed to find each group of processing elements with the same interconnection relationship as the selected group of processing elements.

In the present disclosure, for example, three groups of processing elements, including {PE0, PE4, PE8, PE9, PE11, PE12, PE15}, {PE1, PE3, PE6, PE9, PE12, PE13, PE14} and {PE0, PE2, PE4, PE5, PE7, PE8, PE10} have the same interconnection relationship as the voter {PE1, PE2, PE5, PE6, PE7, PE10, PE14}.

In S405, the voter set is generated based on the voter and each found group of processing elements.

In the present disclosure, each found group of processing elements may constitute a voter. According to the above example, the voter set may include four voters respectively formed by four groups of processing elements including {PE1, PE2, PE5, PE6, PE7, PE10, PE14}, {PE0, PE4, PE8, PE9, PE11, PE12, PE15}, {PE1, PE3, PE6, PE9, PE12, PE13, PE14} and {PE0, PE2, PE4, PE5, PE7, PE8, PE10}.

Figure 5:
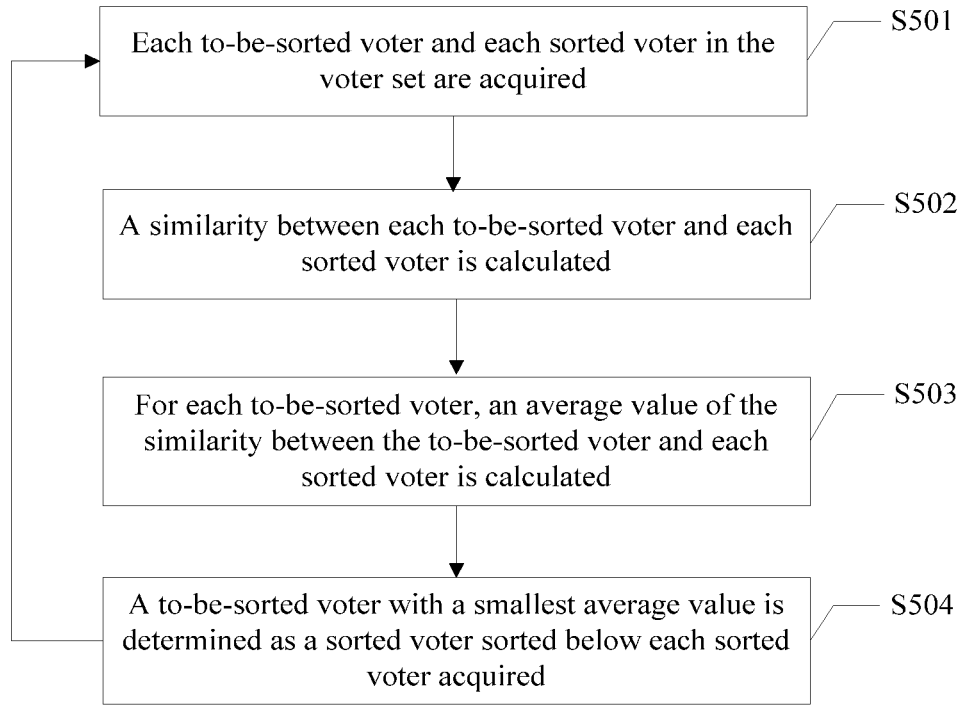
FIG. 5 shows a schematic flowchart of a voter-based method of controlling a redundancy provided by an embodiment of the present disclosure.

Now referring to FIG. 5, FIG. 5 shows a schematic flowchart of a voter-based method of controlling a redundancy provided by an embodiment of the present disclosure. On the basis of the embodiment shown in FIG. 1 or FIG. 4, referring to FIG. 5, the voter set includes a to-be-sorted voter and a sorted voter. A top-sorted voter in the sorted voter may be an arbitrary voter in the voter set. The voter-based method of controlling the redundancy shown in this embodiment may further include the following operations.

In S501, each to-be-sorted voter and each sorted voter in the voter set are acquired.

In S502, a similarity between each to-be-sorted voter and each sorted voter is calculated.

In the present disclosure, the similarity between the to-be-sorted voter and the sorted voter may be calculated using any existing similarity calculation method, which is not limited in the present disclosure. The top-sorted voter in the sorted voter may be the voter obtained through operation S403 in FIG. 4, or may be any voter in the voter set, which is not limited in the present disclosure.

In an embodiment of the present disclosure, the similarity between each to-be-sorted voter and each sorted voter may be calculated as follows. A similarity value for the to-be-sorted voter and the sorted voter is increased by a first preset value in a case that a group of processing elements corresponding to the to-be-sorted voter and a group of processing elements corresponding to the sorted voter include the same processing element, and a position of the processing element in the group of processing elements corresponding to the to-be-sorted voter is the same as a position of the processing element in the group of processing elements corresponding to the sorted voter; the similarity value for the to-be-sorted voter and the sorted voter is increase by a second preset value in a case that the group of processing elements corresponding to the to-be-sorted voter and the group of processing elements corresponding to the sorted voter include the same processing element, and a position of the processing element in the group of processing elements corresponding to the to-be-sorted voter is different from a position of the processing element in the group of processing elements corresponding to the sorted voter, and the second preset value is less than the first preset value; and for each to-be-sorted voter, a sum of the first preset value and the second preset value is calculated to obtain the similarity between the to-be-sorted voter and the sorted voter.

For example, a to-be-sorted voter A corresponds to a group of processing elements {PE1, PE2, PE3}, and a sorted voter B corresponds to a group of processing elements {PE1, PE3, PE5}. Then a processing element at a first position in the group of processing elements corresponding to the to-be-sorted voter A and a processing element at a first position in the group of processing elements corresponding to the sorted voter B are both PE1. Accordingly, the similarity value for the to-be-sorted voter A and the sorted voter B is increased by the first preset value. Furthermore, a processing element at a third position in the group of processing elements corresponding to the to-be-sorted voter A is PE3, and a processing element at a second position in the group of processing elements corresponding to the sorted voter B is also PE3. Then the similarity value for the to-be-sorted voter A and the sorted voter B is increased by the second preset value. The sum of the first preset value and the second preset value is the similarity between the to-be-sorted voter A and the sorted voter B.

In S503, for each to-be-sorted voter, an average value of the similarity between the to-be-sorted voter and each sorted voter is calculated.

For example, if the voter set includes a sorted voter A, a sorted voter B, a to-be-sorted voter C, and a to-be-sorted voter D, then after a similarity Ca between the to-be-sorted voter C and the sorted voter A, a similarity Cb between the to-be-sorted voter C and the sorted voter B, a similarity Da between the to-be-sorted voter D and the sorted voter A and a similarity Db between the to-be-sorted voter D and the sorted voter B are calculated according to operation S501, an average value (Ca+Cb)/2 of the similarity for the to-be-sorted voter C and an average value (Da+Db)/2 of the similarity for the to-be-sorted voter D may be calculated.

In S504, a to-be-sorted voter with a smallest average value is determined as a sorted voter sorted below each sorted voter acquired, and operation S501 is repeatedly performed until each voter in the voter set is sorted.

According to the above example, (Ca+Cb)/2 and (Da+Db)/2 may be compared. If (Ca+Cb)/2 is less than (Da+Db)/2, the to-be-sorted voter C may be arranged subsequent to the sorted voter A and the sorted voter B. If (Ca+Cb)/2 is greater than (Da+Db)/2, the to-be-sorted voter D may be arranged subsequent to the sorted voter A and the sorted voter B.

In an embodiment of the present disclosure, after the voters in the voter set are sorted in the above manner, the target voter in operation S103 is the next voter sorted below the fault voter, then operation S103 of acquiring the target voter from the voter set to replace the detected voter and re-performing the voting operation in the redundancy control using the target voter may include: acquiring a next voter sorted below the detected voter in the voter set so as to replace the detected voter, and re-performing the voting operation in the redundancy control by using a group of processing elements corresponding to the next voter.

According to this embodiment, when the target voter is the next voter sorted after the fault voter, it may be ensured that the next voter has the smallest similarity with the fault voter, so as to avoid using a voter with a large similarity with the fault voter which may cause a voter fault again.

Figure 6:
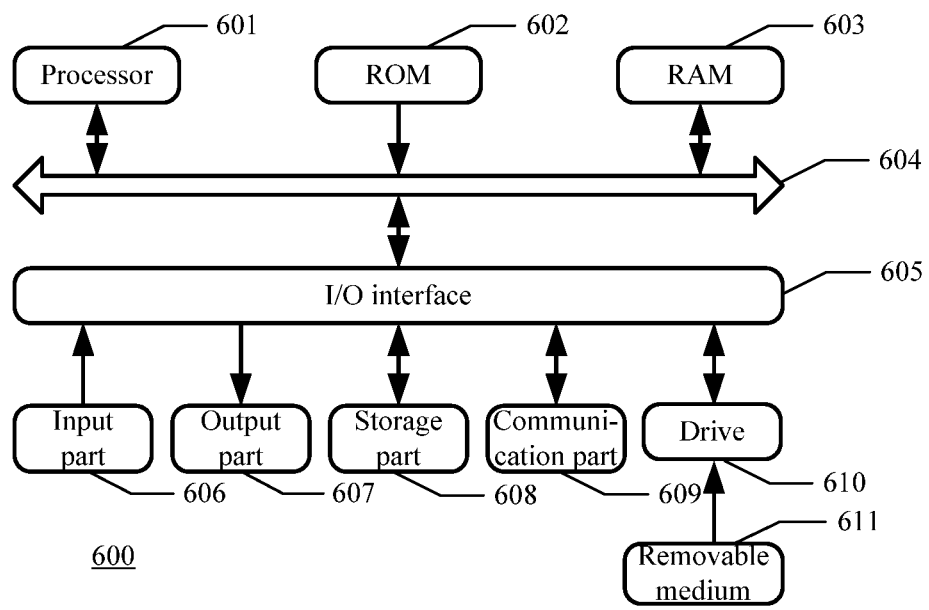
FIG. 6 shows a schematic diagram of a hardware structure of an electronic device.

FIG. 6 schematically shows a block diagram of an electronic device suitable for implementing the above-described method according to the embodiments of the present disclosure. The electronic device shown in FIG. 6 is only an example, and should not bring any limitation to the function and scope of use of the embodiments of the present disclosure.

As shown in FIG. 6, an electronic device 600 according to the embodiments of the present disclosure includes a processor 601, which may execute various appropriate actions and processing according to the program stored in a read only memory (ROM) 602 or the program loaded into a random access memory (RAM) 603 from a storage part 608. The processor 601 may, for example, include a general-purpose microprocessor (for example, CPU), an instruction set processor and/or a related chipset and/or a special-purpose microprocessor (for example, an application specific integrated circuit (ASIC)), and the like. The processor 601 may further include an on-board memory for caching purposes. The processor 601 may include a single processing unit or a plurality of processing units for executing different actions of the method flow according to the embodiments of the present disclosure.

Various programs and data required for the operation of the electronic device 600 are stored in the RAM 603. The processor 601, the ROM 602 and the RAM 603 are connected to each other through a bus 604. The processor 601 executes various operations of the method flow according to the embodiments of the present disclosure by executing the programs in the ROM 602 and/or the RAM 603. It should be noted that the program may also be stored in one or more memories other than the ROM 602 and the RAM 603. The processor 601 may also execute various operations of the method flow according to the embodiments of the present disclosure by executing the programs stored in the one or more memories.

According to the embodiments of the present disclosure, the electronic device 600 may further include an input/output (I/O) interface 605 which is also connected to the bus 604. The electronic device 600 may further include one or more of the following components connected to the I/O interface 605: an input part 606 including a keyboard, a mouse, etc.; an output part 607 including a cathode ray tube (CRT), a liquid crystal display (LCD), etc. and a speaker, etc.; a storage part 608 including a hard disk, etc.; and a communication part 609 including a network interface card such as a LAN card, a modem, and the like. The communication part 609 performs communication processing via a network such as the Internet. A drive 610 is also connected to the I/O interface 405 as required. A removable medium 611, such as a magnetic disk, an optical disk, a magneto-optical disk, a semiconductor memory, and the like, is installed on the drive 610 as required, so that the computer program read therefrom is installed into the storage part 608 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication part 609, and/or installed from the removable medium 611. When the computer program is executed by the processor 601, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium may carry one or more programs that when executed, implement the method according to the embodiments of the present disclosure.

According to the embodiments of the present disclosure, the computer-readable storage medium may be a non-transitory computer-readable storage medium. More specific examples of the computer-readable storage medium may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores programs that may be used by or in combination with an instruction execution system, apparatus or device.

For example, according to the embodiments of the present disclosure, the computer-readable storage medium may include the ROM 602 and/or the RAM 603 described above and/or one or more memories other than the ROM 602 and the RAM 603.

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments may not be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A voter-based method of controlling a redundancy, comprising:
   acquiring a redundancy mode adopted for a target hardware and a voter corresponding to the redundancy mode, wherein the redundancy mode comprises an N-modular redundancy in which an N-modular voter connected to N redundant branches is adopted for the target hardware, or a double modular redundancy in which a double modular voter connected to two redundant branches is adopted for the target hardware, wherein N>2 and N is an integer;
   acquiring a processing element array in the target hardware, in a case that the N-modular redundancy is adopted as the redundancy mode;
   switching, in a case that the double modular redundancy is adopted as the redundancy mode, the redundancy mode adopted for the target hardware to the N-modular redundancy in response to a message indicating a fault state of a redundant branch connected to a detected double modular voter;
   acquiring the processing element array in the target hardware, wherein the processing element array comprises a plurality of processing elements;
   selecting a plurality of groups of processing elements from the processing element array so as to generate a voter set, wherein a corresponding voter is generated for each group of the plurality of groups of processing elements, and the corresponding voter is configured to perform a voting operation in a redundancy control; and
   acquiring, in response to a message indicating a fault state of a detected voter, a target voter from the voter set to replace the detected voter, and re-performing the voting operation in the redundancy control by using the target voter.

2. The voter-based method of controlling the redundancy according to claim 1, further comprising:
   dividing the processing elements in the processing element array into N groups of computing elements and at least one group of idle elements, wherein an interconnection relationship of the N groups of computing elements is equivalent to an interconnection relationship of the at least one group of idle elements, each group of the N groups of computing elements is configured to perform a calculation operation on a first redundant branch, and each group of the at least one group of idle elements is configured to, in response to a fault state of a computing element, replace a group of computing elements comprising the computing element in the fault state and perform the calculation operation; and
   replacing, in response to a message indicating a fault state of a second redundant branch connected to the detected voter, the group of computing elements comprising the computing element in the fault state with the at least one group of idle elements, and re-performing the calculation operation on the first redundant branch.

3. The voter-based method of controlling the redundancy according to claim 1, wherein the selecting a plurality of groups of processing elements from the processing element array so as to generate a voter set comprises:
   acquiring a voter model with an N-modular redundancy as a redundancy mode;
   performing a static compilation on the voter model using an integer linear programming, so as to obtain a compilation result;
   selecting a group of processing elements from the processing element array according to the compilation result, so as to form a voter;
   traversing the processing element array to find each group of processing elements with an interconnection relationship as the selected group of processing elements; and
   generating the voter set based on the voter and each found group of processing elements, wherein each found group of processing elements forms a voter.

4. The voter-based method of controlling the redundancy according to claim 1, wherein the voter set comprises to-be-sorted voters and sorted voters, and the voter sorted at a top among the sorted voters is an arbitrary voter in the voter set, and wherein, after generating the voter set, the method further comprises:
   acquiring each to-be-sorted voter and each sorted voter in the voter set;
   calculating a similarity between each to-be-sorted voter and each sorted voter;
   calculating an average value of the similarities for each to-be-sorted voter with respect to the sorted voters; and
   determining a to-be-sorted voter with a smallest average value as a sorted voter sorted below each sorted voter acquired, and repeatedly acquiring each to-be-sorted voter and each sorted voter in the voter set until each voter in the voter set is sorted.

5. The voter-based method of controlling the redundancy according to claim 4, wherein the calculating a similarity between each to-be-sorted voter and each sorted voter comprises:
   increasing a similarity value for each to-be-sorted voter and each sorted voter by a first preset value in a case that a group of processing elements corresponding to each to-be-sorted voter and a group of processing elements corresponding to each sorted voter comprise the same processing element as a target process element, and a first position of the target processing element in the group of processing elements corresponding to each to-be-sorted voter is same as a second position of the target processing element in the group of processing elements corresponding to each sorted voter;
   increasing the similarity value for each to-be-sorted voter and each sorted voter by a second preset value in a case that the group of processing elements corresponding to each to-be-sorted voter and the group of processing elements corresponding to each sorted voter comprise the same processing element as the target process element, and the first position of the target processing element in the group of processing elements corresponding to each to-be-sorted voter is different from the second position of the target processing element in the group of processing elements corresponding to each sorted voter, wherein the second preset value is less than the first preset value; and
   calculating, for each to-be-sorted voter, a sum of the first preset value and the second preset value, so as to obtain the similarity between each to-be-sorted voter and each sorted voter.

6. The voter-based method of controlling the redundancy according to claim 5, wherein the acquiring a target voter from the voter set to replace the detected voter, and re-performing the voting operation in the redundancy control by using the target voter comprises:

acquiring a next voter sorted below the detected voter in the voter set, so as to replace the detected voter; and re-performing the voting operation in the redundancy control by using a group of processing elements corresponding to the next voter.

7. The voter-based method of controlling the redundancy according to claim 1, wherein the target hardware is a software-defined chip or a field programmable gate array.

8. An electronic device, comprising a memory, a processor, and a computer program stored in the memory and executable on the processor, wherein the processor, when executing the program, is configured to implement a voter-based operation of controlling a redundancy, comprising:

acquiring a redundancy mode adopted for a target hardware and a voter corresponding to the redundancy mode, wherein the redundancy mode comprises an N-modular redundancy in which an N-modular voter connected to N redundant branches is adopted for the target hardware, or a double modular redundancy in which a double modular voter connected to two redundant branches is adopted for the target hardware, wherein N>2 and N is an integer;

acquiring a processing element array in the target hardware, in a case that the N-modular redundancy is adopted as the redundancy mode;

switching, in a case that the double modular redundancy is adopted as the redundancy mode, the redundancy mode adopted for the target hardware to the N-modular redundancy in response to a message indicating a fault state of a redundant branch connected to a detected double modular voter;

acquiring the processing element array in the target hardware, wherein the processing element array comprises a plurality of processing elements;

selecting a plurality of groups of processing elements from the processing element array so as to generate a voter set, wherein a corresponding voter is generated for each group of the plurality of groups of processing elements, and the corresponding voter is configured to perform a voting operation in a redundancy control; and acquiring, in response to a message indicating a fault state of a detected voter, a target voter from the voter set to replace the detected voter, and re-performing the voting operation in the redundancy control by using the target voter.

9. The electronic device according to claim 8, wherein the processor, when executing the program, is further configured to implement operations comprising:

dividing the processing elements in the processing element array into N groups of computing elements and at least one group of idle elements, wherein an interconnection relationship of the N groups of computing elements is equivalent to an interconnection relationship of the at least one group of idle elements, each group of the N groups of computing elements is configured to perform a calculation operation on a first redundant branch, and each group of the at least one group of idle elements is configured to, in response to a fault state of a computing element, replace a group of computing elements comprising the computing element in the fault state and perform the calculation operation; and replacing, in response to a message indicating a fault state of a second redundant branch connected to the detected voter, the group of computing elements comprising the computing element in the fault state with the at least one group of idle elements, and re-performing the calculation operation on the first redundant branch.

10. The electronic device according to claim 8, wherein the selecting a plurality of groups of processing elements from the processing element array so as to generate a voter set comprises:

acquiring a voter model with an N-modular redundancy as a redundancy mode;

performing a static compilation on the voter model using an integer linear programming, so as to obtain a compilation result;

selecting a group of processing elements from the processing element array according to the compilation result, so as to form a voter;

traversing the processing element array to find each group of processing elements with an interconnection relationship as the selected group of processing elements; and generating the voter set based on the voter and each found group of processing elements, wherein each found group of processing elements forms a voter.

11. The electronic device according to claim 8, wherein the voter set comprises to-be-sorted voters and sorted voters, and the voter sorted at a top among the sorted voters is an arbitrary voter in the voter set, and the voter-based operation of controlling the redundancy, after generating the voter set, further comprises:

acquiring each to-be-sorted voter and each sorted voter in the voter set;

calculating a similarity between each to-be-sorted voter and each sorted voter;

calculating, an average value of the similarities for each to-be-sorted voter with respect to the sorted voters; and determining a to-be-sorted voter with a smallest average value as a sorted voter sorted below each sorted voter acquired, and repeatedly acquiring each to-be-sorted voter and each sorted voter in the voter set until each voter in the voter set is sorted.

12. The electronic device according to claim 11, wherein the calculating a similarity between each to-be-sorted voter and each sorted voter comprises:

increasing a similarity value for each to-be-sorted voter and each sorted voter by a first preset value in a case that a group of processing elements corresponding to each to-be-sorted voter and a group of processing elements corresponding to each sorted voter comprise the same processing element as a target process element, and a first position of the target processing element in the group of processing elements corresponding to each to-be-sorted voter is same as a second position of the target processing element in the group of processing elements corresponding to each sorted voter;

increasing the similarity value for each to-be-sorted voter and the each sorted voter by a second preset value in a case that the group of processing elements corresponding to each to-be-sorted voter and the group of processing elements corresponding to each sorted voter comprise the same processing element as the target process element, and the first position of the target processing element in the group of processing elements corresponding to each to-be-sorted voter is different from the second position of the target processing element in the group of processing elements corresponding to each sorted voter, wherein the second preset value is less than the first preset value; and calculating, for each to-be-sorted voter, a sum of the first preset value and the second preset value, so as to obtain the similarity between each to-be-sorted voter and each sorted voter.

13. The electronic device according to claim 12, wherein the acquiring a target voter from the voter set to replace the detected voter, and re-performing the voting operation in the redundancy control by using the target voter comprises:

acquiring a next voter sorted below the detected voter in the voter set, so as to replace the detected voter; and re-performing the voting operation in the redundancy control by using a group of processing elements corresponding to the next voter.

14. The electronic device according to claim 8, wherein the target hardware is a software-defined chip or a field programmable gate array.

15. A non-transitory computer-readable storage medium having a computer program stored thereon, wherein the computer program, when executed by a processor, is configured to implement a voter-based operation of controlling a redundancy, comprising:

acquiring a redundancy mode adopted for a target hardware and a voter corresponding to the redundancy mode, wherein the redundancy mode comprises an N-modular redundancy in which an N-modular voter connected to N redundant branches is adopted for the target hardware, or a double modular redundancy in which a double modular voter connected to two redundant branches is adopted for the target hardware, wherein N>2 and N is an integer;

acquiring a processing element array in the target hardware, in a case that the N-modular redundancy is adopted as the redundancy mode;

switching, in a case that the double modular redundancy is adopted as the redundancy mode, the redundancy mode adopted for the target hardware to the N-modular redundancy in response to a message indicating a fault state of a redundant branch connected to a detected double modular voter;

acquiring a processing element array in a target hardware, wherein the processing element array comprises a plurality of processing elements;

selecting a plurality of groups of processing elements from the processing element array so as to generate a voter set, wherein a corresponding voter is generated for each group of the plurality of groups of processing elements, and the corresponding voter is configured to perform a voting operation in a redundancy control; and acquiring, in response to a message indicating a fault state of a detected voter, a target voter from the voter set to replace the detected voter, and re-performing the voting operation in the redundancy control by using the target voter.

* * * * *